United States Patent

Damico

[15] 3,700,676
[45] Oct. 24, 1972

[54] PROCESS FOR PREPARING SALTS OF PYRIDINETHIOL N-OXIDES AND 2,2'-DITHIOPYRIDINE N,N-DIOXIDES

[72] Inventor: Ralph A. Damico, Colerain Township, Hamilton County, Ohio

[73] Assignee: The Procter & Gamble Company, Cincinnati, Ohio

[22] Filed: Aug. 10, 1970

[21] Appl. No.: 62,723

Related U.S. Application Data

[62] Division of Ser. No. 692,274, Dec. 21, 1967, Pat. No. 3,590,035.

[52] U.S. Cl. ........ 260/294.8 G, 260/294.8 J, 424/70, 424/263
[51] Int. Cl. .............................................. C07d 31/50
[58] Field of Search...260/294.8 G, 294.8 F, 294.8 J, 260/607 A

[56] References Cited

UNITED STATES PATENTS 3,288,860  11/1966  Lyness et al. ..........260/607 A

*Primary Examiner*—Alan L. Rotman
*Attorney*—Richard C. White and Jack D. Schaeffer

[57] ABSTRACT

Process for preparing 2-pyridine N-oxide carbanion salts, 2-pyridinethiol N-oxides, salts thereof and 2,2'-dithiopyridine N,N-dioxides which comprises the steps of (1) reacting a pyridine N-oxide with a strong base at from −70° to 150° C. to form a novel pyridine N-oxide carbanion salt and (2) reacting the carbanion salt formed with a sulfur-containing reagent.

5 Claims, No Drawings

PROCESS FOR PREPARING SALTS OF PYRIDINETHIOL N-OXIDES AND 2,2'-DITHIOPYRIDINE N,N-DIOXIDES

This application is a division under Rule 147 of copending patent application filed Dec. 21, 1967, Ser. No. 692,274, now U.S. Pat. No. 3,590,035 dated June 29, 1971.

BACKGROUND OF INVENTION

This invention relates in part to pyridine N-oxide derivatives. More particularly, it relates to pyridine N-oxide carbanion salts useful in the synthesis of salts of 2-pyridinethiol N-oxides and 2,2'-dithiopyridine N,N-dioxides. This invention also relates to methods of preparing pyridine N-oxide carbanion salts and methods for their conversion to 2-pyridinethiol N-oxide salts and 2,2'-dithiopyridine N,N-dioxides.

Pyridinethiol N-oxides and salts thereof are known compounds having been described in U.S. Pat. Nos. 2,686,786 (Aug. 17, 1954), 2,809,971 (Oct. 15, 1957), 2,786,847 (Mar. 26, 1957), 3,236,733 (Feb. 22, 1966) and in J. Am. Chem. Soc. 72, 4362 (1950) and have been described as having antibacterial and antifungal properties. Such materials are especially noted for their remarkable anti-dandruff efficacy.

The 2-pyridinethiol N-oxides with which the present invention is concerned are believed to exist in tautomeric equilibrium with 1-hydroxy-2-pyridinethiones alternatively termed 1-hydroxy-2 (1H)-pyridinethiones. For example, 2-pyridinethiol N-oxide and its tautomeric form are represented as follows:

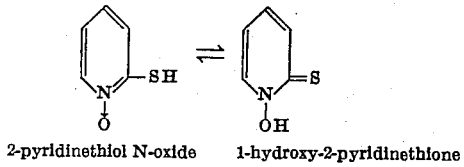

2-pyridinethiol N-oxide     1-hydroxy-2-pyridinethione

The term 2-pyridinethiol N-oxides as hereinafter employed is intended to encompass the tautomeric 1-hydroxy-2-pyridinethiones as well. Salts of these compounds may be represented by substitution of a cation for the hydrogen of one of the tautomeric forms. Depending upon the valence of the cation involved, there may be more than one pyridinethiol N-oxide group present in the compound. Disulfides of such compounds may be represented by the attachment of two 2-pyridinethiol N-oxide groups by the elimination of two hydrogens from the sulfur atoms to give a sulfur-to-sulfur or disulfide linkage.

The prior art preparation of salts of 2-pyridinethiol N-oxides has been effected by a process requiring a relatively large number of steps. Generally, the prior art practice of the preparation of 2-pyridinethiol N-oxide salts has included (1) conversion of a 2-halopyridine to a 2-halopyridine N-oxide by reaction with a per-acid such as perbenzoic or peracetic acid, (2) reaction of the N-oxide formed with an alkali metal hydrosulfide, alkali metal sulfide or thiourea to effect substitution of a mercapto group for the halo-substituent and (3) reaction of the 2-pyridinethiol N-oxide formed with an aqueous solution of a basic compound such as sodium carbonate or a heavy metal compound such as zinc nitrate to effect the formation of a 2-pyridinethiol N-oxide salt.

The prior art process as generally outlined is subject to certain disadvantages. One disadvantage of the prior art process is that it requires the isolation and purification of several intermediates. For example, the 2-halopyridine employed in the prior art process must be separated from the small amounts of 2,6-dihalopyridine which inevitably form during the halogenation of pyridine despite the controlled conditions of halogenation employed. The purification of 2-halopyridine while tending to add to the cost of the initial starting material is necessary to avoid formation of undesirable disubstituted products which result from substitution of the halo-groups with mercapto groups upon subsequent reaction with alkali metal hydrosulfide.

Another undesirable aspect of the prior art process is the fact that the 2-halopyridine N-oxide produced by reaction of a per-acid with 2-halopyridine may not be reacted subsequently with an alkali metal sulfide or hydrosulfide to form the desired pyridinethiol N-oxide prior to separation from the unreacted per-acid. This separation is normally achieved by several extractions with hydrochloric acid solution followed by evaporation to dryness. Alternatively, the 2-halopyridine N-oxide may be prepared by reaction of the 2-halopyridine in acetic acid with a peracetic acid solution, and isolated by removal of acetic acid under reduced pressure, pouring of the residue over cracked ice, treatment with concentrated sodium hydroxide, extraction with chloroform, drying over magnesium sulfate, addition of ether, concentration and separation by filtration of the formed crystals. These techniques are described in U.S. Pat. No. 2,686,786.

A further disadvantage of the prior art method of preparing 2-pyridinethiol N-oxides is that certain of the per-acids, particularly peracetic acid, explode violently on heating which fact requires that processing conditions and precautionary measures be employed and carefully controlled so as to enable the process to be conducted safely and efficiently.

It is an object of the present invention to provide an improved method for preparing 2-pyridinethiol N-oxides and salts thereof.

It is another object of the present invention to provide an improved method for preparing 2,2'-dithiopyridine N,N,-dioxides.

It is a further object of the present invention to provide novel carbanion salts which may be simply and efficiently converted to 2-pyridinethiol N-oxides, salts thereof and 2,2'-dithiopyridine N,N-dioxides.

SUMMARY OF THE INVENTION

These and other objects of the present invention are achieved in accordance with the present invention which comprises a process of preparing salts of pyridinethiol N-oxides of the formula

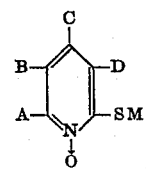

wherein A, B, C and D are each selected from the group consisting of hydrogen; alkyl of from one to about 12 carbon atoms; alkenyl of from two to about 12 carbon atoms; alkoxy of from one to about 12 carbon atoms; aryl of from about six to about 12 carbon atoms; and aryloxy of from six to about 12 carbon atoms; and M is an alkali metal; which comprises (1) reacting at a temperature of about −70° C. to about 150° C. a pyridine N-oxide of the formula

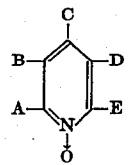

wherein A, B, C, D and E are defined in the same manner as A, B, C and D above and at least one of A and E is hydrogen with a strong alkali metal-containing base selected from the group consisting of alkali metals; alkali metal oxides; alkali metal hydrides; alkali metal alkyls of from one to about 12 carbon atoms; alkali metal alkoxides of from one to about four carbon atoms; alkali metal aryls of from six to about 14 carbon atoms; alkali metal aralkyls of from seven to about 15 carbon atoms; alkali metal amides of the formula

wherein each R is hydrogen or alkyl of one to about four carbon atoms and M is an alkali metal; alkali metal sulfinyl carbanion salts of the formula

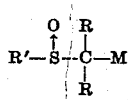

wherein R' is an alkyl of from one to about four carbon atoms and each R is as defined above; complexes of alkali metal hydrides and diamines of the formula $R_2N$—$R'$—$NR_2$ wherein each R is an alkyl of from one to about 20 carbon atoms and R' is an alkylene group containing from one to about five carbon atoms and wherein the total number of carbon atoms in said diamine is from five to about 28 carbon atoms; and complexes of alkali metal alkyls having from one to about 12 carbon atoms and diamines of the formula $R_2N$—$R'$—$N$—$R_2$ wherein each R is an alkyl of from one to about 20 carbon atoms and R' is an alkylene group containing from one to about five carbon atoms and wherein the total number of carbon atoms in said diamine is from five to about 28 carbon atoms; and (2) reacting at a temperature of from about −70° C. to about 150° C. the product formed thereby with a neutral or electrophilic sulfur-containing transfer agent, said transfer agent being susceptible of nucleophilic attack and removal of a sulfur atom.

Also provided by the present invention are novel carbanion salts of the formula

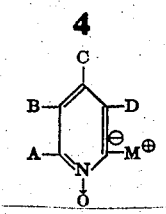

wherein A, B, C and D are defined as above and M is an alkali metal.

Also provided by the present invention is a novel process of preparing dithiopyridine N,N-dioxides of the formula

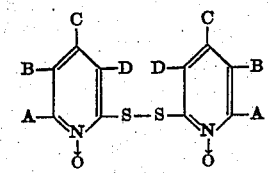

by a process which comprises
1. reacting a pyridine N-oxide of the formula

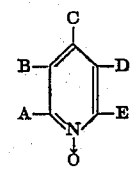

hereinbefore described at a temperature of about −70° C. to about 150° C. with an alkali metal-containing strong base hereinbefore described and
2. reacting the carbanion formed thereby at a temperature of about −70° C. to about 150° C. with a sulfur monohalide of the formula $S_2X_2$ where X is halogen.

DETAILED DESCRIPTION OF THE INVENTION

The pyridine N-oxides employed in the present invention are represented by the formula

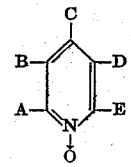

wherein A,B,C,D and E are each selected from the group consisting of hydrogen; alkyl of from one to about 12 carbon atoms, (e.g., methyl, ethyl, n-propyl, isopropyl, n-butyl, isobutyl, n-pentyl, isopentyl, n-hexyl, n-heptyl, n-octyl, isooctyl, 2-ethylhexyl, diisobutyl, n-nonyl, tripropylene, n-decyl, n-undecyl, n-dodecyl); alkenyl of from two to about 12 carbon atoms (e.g., vinyl, allyl, methallyl, 5-hexenyl, 8-dodecenyl); alkoxy of from one to about 12 carbon atoms, (e.g., methoxy, n-hexoxy, n-octoxy, n-dodecoxy); aryl of from about six to 12 carbon atoms, (e.g., phenyl, 4-biphenylyl, 2-naphthyl); and aryloxy of from about six to 12 carbon atoms (e.g., phenoxy, 4-biphenylyloxy, 2-naphthoxy) at least one of A and E being hydrogen. The pyridine N-oxides which react with an alkali-metal-containing base to form salts of pyridine N-oxide carbanions of this invention are characterized by the presence of a nitrogen oxide (N → O) group intermediate two carbon atoms, at least one of which carbon atoms is unsubstituted i.e., contains a replaceable hydrogen atom. It has been found, surprisingly, that a hydrogen atom on an unsubstituted carbon atom of such a pyridine N-oxide molecule is sufficiently activated that certain strong alkali metal-containing bases (hereinafter described) can remove said hydrogen atom to form the novel pyridine N-oxide carbanion of this invention

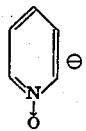

as its alkali metal salt,

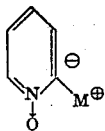

wherein M is an alkali metal, e.g., the sodium salt

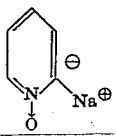

Examples of useful pyridine N-oxide compounds include pyridine N-oxide, 2-methyl pyridine N-oxide, 2-ethyl pyridine N-oxide, 2-n-propyl pyridine N-oxide, 2-n-butyl pyridine N-oxide, 2-n-pentyl pyridine N-oxide, 2-n-hexyl pyridine N-oxide, 2-n-nonyl pyridine N-oxide, 2-n-decyl pyridine N-oxide, 2-n-undecyl pyridine N-oxide, 2-n-dodecyl pyridine N-oxide, 2-vinyl pyridine N-oxide, 2-methallyl pyridine N-oxide, 2-(11-dodecenyl) pyridine N-oxide, 2-phenyl pyridine N-oxide, 2(1-naphthyl) pyridine N-oxide, 2(4-biphenylyl) pyridine N-oxide, 2-phenoxy pyridine N-oxide, 2(4-biphenylyloxy) pyridine N-oxide, 2(2-naphthoxy) pyridine N-oxide, 2-methoxy pyridine N-oxide, 2-n-hexoxy pyridine N-oxide, 2-n-octoxy pyridine N-oxide and 2-n-dodecoxy pyridine N-oxide. Also useful are those compounds wherein the aforementioned substituent groups are attached to the 3- or 4- positions of the pyridine N-oxide nucleus. Likewise compounds where the aforementioned substituents are on any two or more of the 2-, 3-, 4- or 5- positions can be employed.

Preferred pyridine N-oxide compounds include pyridine N-oxide, and substituted pyridine N-oxides having one or more alkyl or alkenyl groups of from one to about four carbon atoms, as for example, 3-methyl pyridine N-oxide (3-picoline N-oxide), 4-n-propyl pyridine N-oxide, 3,4-dimethyl pyridine N-oxide (3,4-lutidine N-oxide), 4-ethylpyridine N-oxide and 4-vinyl pyridine N-oxide, these being preferred for the reasons that they are readily available and undergo the desired reaction with strong base with remarkable facility.

It will be appreciated, of course, that the above described pyridine N-oxide derivatives are described by way of example only and that any substituted pyridine N-oxide characterized by at least one unsubstituted position adjacent the N-oxide moiety may be employed so long as the substituent groups are of a nature and are so positioned as to be substantially non-interfering, e.g., are non-reactive with the alkali metal-containing base and do not sterically or by induction hinder removal of a hydrogen atom from a pyridine N-oxide compound.

The reaction of pyridine N-oxides with an alkali metal containing strong base to form the novel carbanions of the present invention may be represented as follows:

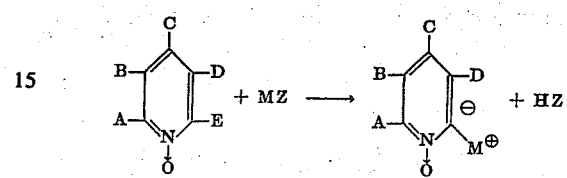

wherein M represents an alkali metal and Z represents, for example, alkali metal oxide (MO⁻), hydride (H⁻), alkyl of from one to about 12 carbon atoms, alkoxy of from one to about four carbon atoms, aryl of from six to about 14 carbon atoms, aralkyl of from seven to about 15 carbon atoms, amino, $C_{1-4}$ mono- and dialkylamino and alkyl sulfinyl carbanion of the formula

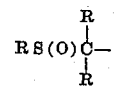

wherein R' is an alkyl of from one to about four carbon atoms and each R is hydrogen or an alkyl of one to about four carbon atoms. Depending upon the particular strong base employed the by-product, HZ, is hydrogen gas as is the case where an alkali metal or alkali metal hydride is employed or is an alkane, an alkanol, an aromatic hydrocarbon, an aralkane, ammonia, a primary or secondary amine, or a dialkyl sulfoxide.

The alkali metal-containing strong bases which effect removal of a hydrogen atom from a carbon atom adjacent to the N→O group of a pyridine N-oxide to form the novel pyridine N-oxide carbanion salts of the present invention are selected from the group consisting of alkali metals (e.g., sodium, potassium, lithium and cesium); alkali metal oxides (e.g., sodium oxide, potassium oxide); alkali metal hydrides (sodium hydride, potassium hydride, lithium hydride); alkali metal alkyls wherein the alkyl group contains from one to about 12 carbon atoms (e.g., methyl sodium, ethyl potassium, n-propyl lithium, 2-ethylhexyl sodium; n-dodecyl lithium); alkali metal alkoxides of the formula ROM wherein R is an alkyl group containing from one to about four carbon atoms (sodium methoxide, sodium ethoxide, potassium n-butoxide); alkali metal aryls wherein the aryl group contains from six to about 14 carbon atoms (e.g., phenyl sodium, 2-naphthyl sodium, 9-anthracyl lithium); alkali metal aralkyls wherein the aralkyl group contains from seven to about 15 carbon atoms (e.g., benzyl potassium, 3-phenylpropyl sodium, 2-naphthylmethyl lithium, 2-phenylpropyl lithium); alkali metal amides (sodamide, potassium amide, lithium amide); mono- and dialkyl substituted alkali metal amides wherein the alkyl group contains from one to about four carbon atoms (methyl sodamide, lithium methyl amide, dimethyl sodamide, lithium dibutyl amide); and alkali metal sulfinyl carbanion salts of the formula

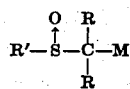

wherein each R group is an alkyl of from one to about four carbon atoms or is hydrogen and R' is an alkyl of from one to about four carbon atoms, (e.g., sodium methyl sulfinyl carbanion, lithium butyl sulfinyl propyl carbanion, potassium ethyl sulfinyl dibutyl carbanion).

Also useful in the exercise of the present invention are alkali metal-containing complexes of organic diamines and alkali metal hydrides or alkyls. While complexes of alkali metal hydrides or alkyls and organic diamines wherein the molar ratio of alkali metal-containing compound to amine is from about 0.5 to about 10 moles per mole of amine can be employed, the ratio is normally 1:1. Suitable diamine complexing agents include N-methyl, N-ethyl, N'-propyl, N'-butyl-propylenediamine, N-dodecyl, N,N',N'-trimethyl-methylenediamine, N-octyl, N,N',N'-triethylbutylenediamine, N,N,N',N'-tetraethylpropylenediamine, and N-eicosyl, N,N',N'-trimethyethylenediamine.

The preferred diamine complexing agents are N,N,N',N'-tetramethylethylenediamine and N,N,N',N'-tetraethylethylenediamine.

Other examples of utilizable strong bases include alloys of alkali metals such as sodium-potassium alloys, organo-metallic compounds of alkali metals having a metal to carbon bond such as methyl lithium, ethyl lithium, n-butyl lithium, n-octyl lithium, n-dodecyl sodium, phenyl lithium, 2-naphthyl lithium, 9-anthracyl sodium, phenyl potassium, benzyl lithium, 1-naphthylmethyl sodium, and 9-anthracylmethyl sodium, sulfinyl carbanions such as sodium propyl sulfinyl carbanion and lithium ethyl sulfinyl dimethyl carbanion, alkali metal amides such as cesium amide, lithium and cesium diethyl amide, potassium methyl amide and potassium propyl amide. Alkoxides include potassium tertiary butoxide, sodium n-propoxide, lithium ethoxide and potassium ethoxide. Likewise utilizable are the tetramethylethylenediamine complexes of the aforementioned alkali metal hydrides and alkyls.

Preferred strong bases of the invention are those which enable production of the pyridine N-oxide carbanion salts in a pure form by evolving a gas which may be collected. Alkali metal hydrides, amides and alkyls are examples of such materials, hydrogen, ammonia and alkane gases being the side reaction products. The alkali metal hydrides and amides are especially preferred both from the standpoint of facility in undergoing reaction and commercial availability. In the case of a preferred base such as sodium amide, for example, the ammonia which is given off during the formation of the pyridine N-oxide carbanion may be recycled to form additional sodium amide by reaction with sodium metal. Therefore, the net reaction, in effect, would be between sodium metal and pyridine N-oxide starting compound.

The novel carbanions of the present invention are prepared by reacting the pyridine N-oxide compound and strong base at a temperature of from about −70° to 150° C., preferably at about 0° to 80° C. Normally the reaction is effected in about one to about four hours and when a gaseous by-product is evolved, it is normally convenient to conduct the reaction until such evolution of gas ceases.

The reaction is normally carried out at slightly above room temperature (25° C.) when metal amides, metal hydrides and metal oxides are used. When the free alkali metals or metal alkyls are used, somewhat lower temperatures are preferred because of the greater reactivity of these reactants. When using sodium metal or butyl lithium, for example, a preferred temperature range is about 0° to 30° C. When using potassium metal or a sodium-potassium alloy, a preferred temperature range is about 0° to 20° C. Carbon-metal bonds are unstable at elevated temperatures and at about 150° C., for example, pyridine N-oxide carbanion salts are destroyed. Therefore, elevated temperatures above the decomposition temperature of the carbanion salt prepared are undesirable. Moreover, there is often little or no advantage to conducting the reaction at an elevated temperature. For example, pyridine N-oxide is converted to its carbanion salt with lithium hydride at room temperature (25° C.) in about 4 hours as evidenced by the time required for the cessation of the evolution of hydrogen gas. At 50° C., the reaction is likewise completed in about 4 hours. Temperatures lower than room temperature are not normally desirable when metal amides, metal hydrides and metal oxides are used, because the speed of the reaction is undesirably decreased. As indicated above, temperatures lower than about room temperature are preferred in the case of the use of alkali metals and alkali metal alkyls.

The amount of strong base employed in effecting the production of pyridine N-oxide carbanion salts is not a critical aspect of the present invention. While some product forms when a small amount of base is employed relative to the pyridine N-oxide, at least about 0.5 moles of base per mole of N-oxide should normally be employed for satisfactory yields. Since the reaction of pyridine N-oxide and strong base is a stoichiometric one, i.e., it involves reaction on a mole to mole basis, a substantially equimolar amount of base per mole of the N-oxide is preferred for best yields. While there is no upper limit to the amount of base which may be employed, practical considerations are such that it is generally uneconomical to exceed about 10 moles of strong base per mole of the pyridine N-oxide employed. In addition, amounts in excess of about 10 moles of base per mole of N-oxide tend to result in the undesirable formation of carbanion salts having both hydrogens on carbon atoms adjacent the N-oxide moiety replaced by alkali metal atoms.

Normally, the reaction is conducted by adding a solution or suspension of the pyridine N-oxide compound to the strong base or a solution or suspension of strong base. Alternatively, the strong base or solution or suspension thereof can be added to the pyridine N-oxide compound. Since many of the pyridine N-oxide compounds of the present invention have melting points within the temperature range desired for reaction, the strong base employed can be added to the molten pyridine N-oxide. For best yields, however, and for economy of operation it is best to conduct the reaction in the presence of a solvent or diluent. Thus, the use of a solvent or diluent is not a critical aspect of the present invention but constitutes a preferred embodiment. When a solvent or diluent is employed, it should be an organic solvent which is essentially non-reactive, i.e., one which will not detrimentally affect the preparation of the desired pyridine N-oxide carbanion salt.

Suitable solvents or diluents are to be found in such classes of compounds as the aliphatic, aromatic or mixed aliphatic-aromatic ethers, cyclic ethers, amines and alcohols. Among the ether compounds which are suitable as solvents are diethyl ether, dibutyl ether, anisole, diphenyl ether, tetra-hydrofuran, 1,2-dimethoxyethane and diethylene glycol dimethyl ether. Amine compounds which can serve as solvents for the formation and subsequent reaction of salts of pyridine N-oxide carbanions include butylamine, N-methyl butylamine, anhydrous ethylene diamine, pyridine and morpholine. Methanol, ethanol, propanol and butanol are examples of suitable alcohol diluents. Anhydrous liquid ammonia can also be used as a solvent, and is especially suitable when the strong base is an alkali metal amide. Still other compounds which are suitable are N,N-dialkyl amides such as dimethyl formamide, dimethyl acetamide and dialkyl sulfoxides such as dimethyl sulfoxide.

The pyridine N-oxide carbanion salts of the present invention are quite stable at temperatures as high as about 150° C. for periods of up to about 24 hours. The carbanion salts can be isolated by evaporating the solution of carbanion in the reaction solvent to dryness in vacuo. Normally, it is inconvenient to do so since the carbanion salts prepared in accordance with the present invention are employed as intermediates in the preparation of 2-pyridinethiol N-oxide salts by subsequent reaction with a sulfur-containing transfer agent. Preferably the subsequent reaction with sulfur-containing transfer agent is effected in the same reaction vessel as the pyridine N-oxide carbanion salt by employing as the reactant the solution of organic solvent and pyridine N-oxide carbanion salt.

The carbanions prepared in the above described manner are converted to salts of 2-mercapto pyridine N-oxides by reaction with a sulfur-containing transfer agent in accordance with the following scheme:

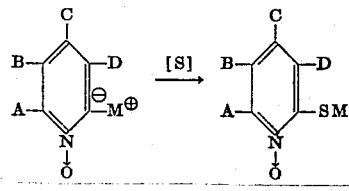

wherein A, B, C, D and M have the meanings heretofore described.

The reaction of the novel carbanion salts of the present invention with a sulfur-containing transfer agent, more specifically defined hereinafter, may be effected by reacting the pyridine N-oxide carbanion salt with the sulfur-containing transfer agent at a temperature of from about −70° C. to about 150° C.

While some product is formed when the amount of sulfur employed is either small or large in relation to the amount of carbanion salt employed, as a practical matter it is uneconomical to use substantially more or less than about an equimolar amount of sulfur and carbanion salt. A molar amount of sulfur of about 0.5 to about 10 per mole of carbanion salt is generally sufficient to form the desired product in satisfactory yield. Preferably about 1 to about 5 moles of transfer agent per mole of carbanion salt are employed.

When temperatures toward the lower end of the specified temperature range are employed, the reaction normally is effected in about 5 hours whereas shorter periods of time, i.e., about 1 hour are required when the reaction is effected at higher temperatures. A preferred operating range is about 25° to 80° C., the reaction proceeding with facility and in a practical amount of time in this temperature range.

Normally, the reaction of a pyridine N-oxide carbanion salt and a sulfur-containing transfer agent is effected by the addition of the sulfur-containing compound to the solution which results from the preparation of the carbanion salt. Inasmuch as the pyridine N-oxide carbanion salt is an intermediate, it generally is not separated and is used without further modification for reaction with the sulfur-containing transfer agent. Any order of mixing can be employed, this not being a critical aspect of the present invention, so long as the requisite proportions of carbanion salt and sulfur-containing transfer agent are allowed to interract in the specified temperature range.

The sulfur-containing transfer agents which are utilizable in effecting conversion of the pyridine N-oxide carbanion salts of the present invention to salts of 2-pyridinethiol N-oxide are those sulfur-containing compounds characterized by the presence of a neutral or electrophilic sulfur atom. Examples of sulfur-containing compounds which contain a neutral or electrophilic sulfur atom and which are utilizable in accordance with the present invention include the following materials:

1. elemental sulfur (e.g., rhombic sulfur, monoclinic sulfur);
2. alkali metal sulfides of the formula $M_2S_x$ where M is an alkali metal (e.g., sodium, potassium, lithium) and $x$ is an integer from 2 to about 50;
3. ammonium sulfides of the formula $(NH_4)_2S_x$ where $x$ is an integer from 2 to 20;
4. sulfurammonium, $S_4N_4$;
5. thiophosphoryl trihalides of the formula $P(S)X_3$ where $X$ is halogen (e.g., chlorine, bromine);
6. alkyl- or aryldihalophosphine sulfides of the formula R—$P(S)X_2$; where R is alkyl of from one to about 12 carbon atoms (e.g., methyl, ethyl, ethylhexyl, dodecyl); aryl of from six to about 14 carbon atoms; and X is halogen;
7. dialkylhalophosphine sulfides of the formula $R_2P(S)X$ where each R is alkyl of from one to about 12 carbon atoms and X is halogen;
8. phosphinyl sulfenyl halides of the formula $R(RO)P(O)SX$ where each R is alkyl of one to about 12 carbon atoms and
9. tetraalkylphosphonate disulfides of the formula $[(RO)_2 P(S)]_2$ where each R is alkyl of one to about 12 carbon atoms;

10. ethylene diphosphine disulfides of the formula [R$_2$P(S)CH2—]$_2$ where each R is alkyl of one to about 12 carbon atoms;
11. isothiocyanates of the formula RNC—S where R is an alkyl of from one to about 12 carbon atoms; aryl of six to about 14 carbon atoms (e.g., phenyl, naphthyl; biphenyl); and alkenyl of from two to about 12 carbon atoms (e.g., vinyl, allyl, 4-octenyl, 11-dodecenyl);
12. diisothiocyanates of the formula SCN—R—NCS where R is an alkylene radical of from one to about 12 carbon atoms (e.g., methylene, ethylene, ethylidene, propylene);
13. thioepoxides of the formula

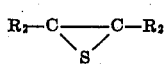

where each R is hydrogen or an alkyl or alkoxy of from one to about 12 carbon atoms; or aryl of from six to about 14 carbon atoms;
14. ethylenethiocarbonates of the formula

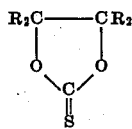

where each R is hydrogen; alkyl of from one to about 12 carbon atoms; or aryl of six to about 14 carbon atoms;
15. thioketones of the formula R$_2$C=S where each R is a tertiary alkyl of from four to about 12 carbon atoms or aryl of from six to about 12 carbon atoms; and
16. organopolysulfides of the formula R —(S)$_x$ —R where each R is alkyl of from one to about 12 carbon atoms; or alkenyl of from two to about 12 carbon atoms; and x is an integer from 2 to 4;

Preferred sulfur-containing transfer agents are those which undergo reaction with the novel 2-pyridinethiol N-oxide carbanion salts with facility and which are readily available. Preferred transfer agents are the various forms of elemental sulfur, the thioepoxides such as 2,3-epithiopropylmethylether, 2,3-epithiobutene and stilbenepisulfide, ethylene episulfide, and the alkali metal and ammonium sulfides.

Suitable sulfur-containing transfer agents and their formulas are as follows:

| | |
|---|---|
| sodium disulfide | Na$_2$S$_2$ |
| ammonium disulfide | (NH$_4$)$_2$S$_2$ |
| thiophosphoryl trichloride | P(S)Cl$_3$ |
| butyldichlorothiophosphonate | C$_4$H$_9$P(S)Cl$_2$ |
| diethylchlorothiophosphinate | (C$_2$H$_5$)$_2$P(S)Cl |
| methyl methoxyphosphinyl sulfenyl chloride | (CH$_3$)(CH$_3$O)P(O)SCl |
| tetraethylphosphonate disulfide | [(C$_2$H$_5$O)$_2$P(S)]bz2 |
| 1,2-ethylenetetramethyldiphosphine disulfide | [(CH$_3$)$_2$P(S)CH$_2$]$_2$ |
| propylisothiocyanate | C$_3$H$_7$NCS |
| propyldiisothiocyanate | CN-C$_3$H$_7$-SCN |
| 1,2-diphenylethylenethioepoxide | |

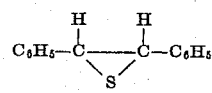

dimethyltrisulfide     CH$_3$-S-S-S-CH$_3$

It will be appreciated, of course, that the aforedescribed sulfur-containing transfer agents are listed by way of example only and are not intended as limiting the scope of the present invention. Inasmuch as any sulfur-containing material having a neutral or electrophilic sulfur atom capable of attack by a negatively charged carbanion may be employed, the precise sulfur-containing transfer agent employed is not considered a critical aspect of the present invention.

In another embodiment of the present invention, the pyridine N-oxide carbanion salts formed by reaction of a pyridine N-oxide with a strong alkali metal-containing base are converted readily to 2,2'-dithiopyridine N,N-dioxides.

The 2,2'-dithiopyridine N,N-dioxides are prepared in accordance with this invention by reacting the pyridine N-oxide carbanion salts with a sulfur monohalide at a temperature of from about −70° to 150° C. The conditions of reaction are normally the same conditions under which the carbanions are allowed to react with the neutral or electrophilic sulfur-containing transfer agents of the present invention. Since the reaction to form 2,2'-dithiopyridine N-N-dioxides involves the attachment of two pyridine oxide groups per mole of sulfur monohalide, from about 0.25 to about 5 moles and preferably about 0.5 to about 2.5 moles of sulfur monohalide per mole of pyridine N-oxide carbanion salt are employed. Inasmuch as the reaction does not appear to involve removal or transfer of a sulfur atom from a sulfur monohalide to the pyridine N-oxide carbanion salt, sulfur monohalides are not transfer agents in the sense hereinbefore employed. Rather, the two sulfur atoms present in sulfur monohalides remain substantially intact, the reaction proceeding by displacement of halogen atoms. The reaction of the novel carbanions of the present invention with sulfur monochloride may be represented as follows:

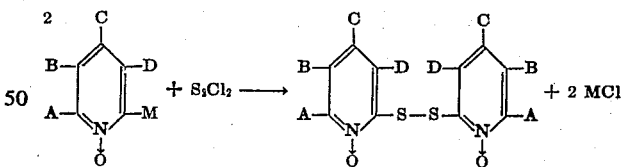

In the above equation A, B, C, D and M have the same meanings as defined above.

The alkali metal salts of 2-pyridinethiol N-oxides prepared in accordance with the present invention are converted readily to 2-pyridinethiol N-oxides per se by neutralization of the alkali salts with an inorganic mineral acid. Hydrochloric acid, mentioned by way of example, is useful for this purpose. It will be appreciated, however, that any of the common mineral acids normally employed to effect neutralization can be likewise employed herein.

The heavy metal salts of 2-pyridinethiol N-oxides may be prepared by reacting a 2-pyridinethiol N-oxide or soluble salt thereof such as alkali metal or ammonium salt with a soluble compound of the desired heavy metal in a solvent for the reactants and recovering the reaction product. Suitable heavy metal salts useful in effecting formation of pyridinethiol N-oxide salts include nitrates, halides, sulfates and acetates of copper, iron, manganese, tin, mercury, cobalt, chromium, lead, gold, cadmium, nickel, silver, zinc, titanium, arsenic, antimony and bismuth. The term heavy metal as herein employed is intended to include heavy non-metals of metallic character, such as arsenic.

The alkali metal salts of 2-pyridinethiol N-oxides and the 2,2'-dithiopyridine N,N-dioxides prepared in accordance with the present invention possess antibacterial and/or antifungal properties and can be employed in detergent formulations, particularly as antidandruff agents in shampoo compositions. Similarly, 2-pyridinethiol N-oxides per se as well as heavy metal salts thereof, particularly zinc, cadmium, tin and zirconium salts of pyridinethiol N-oxides and organic amine and quaternary salts are especially effective antidandruff compounds for use in shampoo formulations. The efficacy of these materials as anti-dandruff compounds is known and is described in detail in U.S. Pat. No. 3,236,733 (Feb. 22, 1966) the disclosure of which is hereby incorporated by reference.

The following examples illustrate in detail the preparation of compositions characterized by antibacterial, antifungal and antidandruff properties. Those preparations involving contact with a sulfur transfer agent for approximately 17½ hours correspond to those conveniently allowed to set overnight, the period of actual reaction being much less than 17½ hours. It will be understood that the invention is not confined to the specific limitations set forth in the following examples but rather, to the scope of the appended claims.

EXAMPLE I

Preparation of the 2-sodio pyridine N-oxide carbanion salt and the sodium salt of 2-pyridinethiol N-oxide A. A 100 ml. flask equipped with magnetic stirring means and an air-tight ground glass fitting provided with a single outlet connected to a mineral oil bubbler was employed in the present example. To the 100 ml. flask was added 0.52 g. (0.0218 mole) of sodium hydride and the flask was dried by flushing with argon gas. A solution of 2.1 g. (0.0218 mole) of pyridine N-oxide in 20 ml. of dimethyl formamide was added to the flask containing the sodium hydride and the reaction mass was heated with stirring at 60° C. The reaction was allowed to proceed for about one hour until the evolution of hydrogen gas had ceased. The product formed was found by analysis to be a solution of approximately 2.5 grams of the 2-sodio pyridine N-oxide carbanion salt in dimethylformamide. The solution was used without further modification in part B which appears hereinafter.

Substantially equivalent results are obtained when either potassium hydride, lithium hydride, sodium metal, lithium metal or potassium metal is substituted for sodium hydride in that the alkali metal pyridine N-oxide carbanions are formed.

B. The solution of pyridine N-oxide carbanion salt in dimethylformamide prepared as described above was cooled to room temperature and 0.7 g. (0.0218 mole) of elemental sulfur was added to the reaction vessel causing the temperature to rise to 39° C. The reaction vessel was allowed to stand about 17 hours at room temperature (approximately 25° C.). The reaction mass was filtered to remove unreacted sulfur and the resulting solution was evaporated to dryness in vacuo to yield approximately 1.5 grams of the sodium salt of 2-pyridinethiol N-oxide.

EXAMPLE II

Preparation of the 2-lithio pyridine N-oxide carbanion salt and the lithium salt of 2-pyridinethiol N-oxide The same apparatus employed in Example I above was employed herein. To 1.0 g. (0.01 mole) of pyridine N-oxide in 40 ml. of diethyl ether solvent, 7 ml. of a 1.6 Molar solution of n-butyl lithium were added at 15° C. The mixture which turned rust-color was stirred for 1 hour with formation of the 2-lithio pyridine N-oxide carbanion salt. The carbanion salt solution was reacted with 0.77 g. of elemental sulfur at 35° C. for 1½ hours. The product formed (yield approximately 0.5 grams) was the lithium salt of 2-pyridinethiol N-oxide in diethyl ether.

Substantially similar results are obtained when the following compounds are employed in lieu of n-butyl lithium: methyl lithium; ethyl lithium; n-octyl lithium; n-dodecyl lithium; phenyl lithium; benzyl lithium; and lithium metal.

EXAMPLE III

Preparation of the 6-sodio-3-methylpyridine N-oxide carbanion salt and 6-mercapto-3-methylpyridine N-oxide Employing the apparatus and method of Example I (A) and (B) 0.81 grams (0.022 mole) of sodium hydride were reacted at 25° C. with 2.0 grams (0.018 mole) of 3-methyl pyridine N-oxide dissolved in 50 ml. of Monoglyme, $CH_3OCH_2CH_2OCH_3$. The reaction was allowed to proceed for 5 hours, the solution turning dark yellow. The product formed was the 6-sodio-3-methylpyridine N-oxide carbanion salt in Monoglyme. To the Monoglyme and carbanion salt was added 1.8 grams (0.02 mole) of 2,3-epithiopropylmethyl ether. The reaction was allowed to continue for 6 hours at 50° C. yielding a product which upon evaporation to dryness in vacuo yielded approximately 1.5 grams of the sodium salt of 6-mercapto-3-methylpyridine N-oxide.

Substantially equivalent results are obtained when the following strong bases are employed in lieu of sodium hydride in that 2-sodio-pyridine N-oxide carbanion salts are obtained: sodamide; dimethylsodamide; sodium oxide; sodium methyl sulfinyl carbanion; sodium butyl sulfinyl carbanion.

EXAMPLE IV

The preparation of the 2-potassio pyridine N-oxide carbanion salt and 2-pyridinethiol N-oxide The same apparatus employed in Example I was employed herein. To 4.1 grams (0.037 mole) of potassium tertiarybutoxide dried by flushing with argon was added at 60° C. a solution of 3.0 grams of pyridine N-oxide (0.032 mole) in 100 ml. of dimethyl sulfoxide (DMSO). The reaction product, 2-potassio pyridine N- oxide carbanion salt in DMSO, was reacted at 25° C. for 17½ hours with 1 gram (0.032 moles) elemental sulfur as the sulfur transfer agent to form approximately 1.3 grams of the potassium salt of 2-pyridinethiol N-oxide in DMSO.

Substantially equivalent results are obtained in that the corresponding substituted carbanion salts are obtained when the following pyridine N-oxide compounds are employed in lieu of pyridine N-oxide: 4-methyl pyridine N-oxide, 3-n-propyl pyridine N-oxide, 4(2-butenyl)pyridine N-oxide, 3,5-divinyl pyridine N-oxide.

EXAMPLE V

The preparation of the 2-sodio pyridine N-oxide carbanion salt and the sodium salt of 2-pyridinethiol N-oxide Following the procedure of Example I, (A) and (B), 2.0 grams (0.02 mole) of pyridine N-oxide were reacted with 0.55 gram of sodium hydride (0.02 mole) at 60° C. for 1 hour, employing 30 ml. of tetrahydrofuran as the solvent. Approximately 2.5 grams of the 2-sodio pyridine N-oxide carbanion salt was formed. Subsequent reaction was with 0.7 gram (0.02 mole) elemental sulfur at 25° C. for approximately 17½ hours to form a product which upon drying in vacuo yielded approximately 1.5 grams of the sodium salt of 2-pyridinethiol N-oxide.

Substantially similar results are obtained when the following sulfur transfer agents are employed in lieu of elemental sulfur; lithium disulfide; ammonium disulfide; sulfurammonium; sodium polysulfide (e.g. having a distribution of from two to about 40 sulfur atoms); thiophosphoryl tribromide; n-octyldichlorothiophosphonate; phenyldichlorothiophosphonate; dioctylchlorothiophosphinate; ethyl ethoxyphosphinyl sulfenyl chloride; tetrabutylphosphonate disulfide; 1,2-ethylenetetrabutyldiphosphine disulfide; phenylisothiocyanate; n-octylisothiocyanate; allylisothiocyanate; vinylisothiocyanate; butyldiisothiocyanate; ethylenethioepoxide; 1,2-di-n-hexylethylenethioepoxide; 1,2-dimethoxyethylenethioepoxide; 1,2-diphenylethylenethiocarbonate; ethylenethiocarbonate; 1,2-dibutylethylenethiocarbonate; ditertbutylthioketone; diphenylthioketone; di-n-octyldisulfide; and diallyltetrasulfide.

EXAMPLE VI

Preparation of the 2-lithio-pyridine N-oxide carbanion salt and the lithium salt of 2-pyridinethiol N-oxide Following the procedure of Example IV above, 2.0 grams of pyridine N-oxide (0.02 mole) were reacted with 0.2 gram of lithium hydride (0.023 mole) for 1 hour at 60° C. employing 50 ml. of Diglyme (CH₃OCH₂CH₂)₂ as solvent. Approximately 2.0 grams of the 2-lithio pyridine N-oxide carbanion salt was formed. Subsequent reaction with 0.7 gram (0.02 mole) elemental sulfur for 17½ hours at 25° C. yielded approximately 1.2 grams of the lithium salt of 2-pyridinethiol N-oxide in Dyglyme.

Substantially similar results are obtained when the following solvents are employed in lieu of Diglyme: diethyl ether; dibutyl ether; anisole; diphenyl ether; tetrahydrofuran; 1,2-dimethoxyethane; pyridine; triethylamine; dimethylformamide and dimethylsulfoxide.

EXAMPLE VII

Preparation of the 2-sodio pyridine N-oxide carbanion and the sodium salt of 2-pyridinethiol N-oxide Following the procedures of Example I (A) and (B), 2.0 grams of pyridine N-oxide (0.02 mole) were reacted with 0.55 gram of sodium hydride (0.02 mole) in 60 ml. of tetrahydrofuran for 1 hour at 60° C. 4.45 grams of stilbene eipsulfide (0.02 mole) were employed as the sulfur transfer agent, the reaction being at 25° C. for approximately 17½ hours. The product was upon evaporation to dryness found to be the sodium salt of 2-pyridinethiol N-oxide (yield approximately 1.0 gram).

The corresponding substituted derivatives are obtained when the following substituted pyridine N-oxide compounds are employed in lieu of pyridine N-oxide: 3-methyl pyridine N-oxide; 3-ethyl pyridine N-oxide; 4-propyl pyridine N-oxide; 3,4-dimethyl pyridine N-oxide; 4-n-dodecyl pyridine N-oxide; 4 vinyl pyridine N-oxide; 3-allyl pyridine N-oxide; 4-phenyl pyridine N-oxide; 4(2-biphenylyl) pyridine N-oxide; 4-phenoxy pyridine N-oxide; 3-ethoxy pyridine N-oxide; 3,4-diethyl pyridine N-oxide; 3-methyl-4-methoxy pyridine N-oxide; and 2,4-dimethyl pyridine N-oxide.

EXAMPLE VIII

Preparation of the 2-lithio pyridine N-oxide carbanion salt and the lithium salt of 2-pyridinethiol N-oxide The procedures of Example I (A) and (B) were repeated except 5.0 grams of pyridine N-oxide (0.047 mole) were reacted with 3.35 grams of n-butyllithium (0.05 mole) in 50 ml. of tetrahydrofuran solvent for 1 hour at 15° C. The sulfur transfer agent employed was 8.0 grams of 2,3-epithiopropylmethylether (0.09 mole) the reaction being at 25° C. for approximately 17-½ hours. The product upon evaporation to dryness was found to be the lithium salt of 2-pyridinethiol N-oxide in a yield of approximately 0.63 grams.

Substantially similar results are obtained when the following strong bases are employed in lieu of n-butyllithium: lithium metal; n-pentyl lithium; n-hexyl lithium; n-nonyl lithium; 9-anthracyl lithium; 2-naphthyl lithium; 1:1 complex of tetramethylethylenediamine and n-butyl lithium; and 1:1 complex of tetramethylethylenediamine and n-butyl lithium.

EXAMPLE IX

Preparation of the 2-potassio pyridine N-oxide carbanion salt and the potassium salt of 2-pyridinethiol N-oxide The procedure of Example IV above was repeated except 2.0 grams of pyridine N-oxide (0.02 mole), 0.84 gram (0.02 mole) of potassium hydride and 100 ml. of Diglyme were employed, the reaction being for 17 hours at 25° C. 2.1 grams of 2,3-epithiopropylmethylether (0.02 mole) were employed as the sulfur transfer agent, the reaction being at 25° C. for approximately 17-½ hours. The product was the potassium salt of 2-pyridinethiol N-oxide in Diglyme in a yield of approximately 1.6 gram.

Substantially similar results are obtained when the following strong bases are employed in lieu of potassium hydride: potassium amide, potassium dibutyl amide; potassium ethyl sulfinyl carbanion; and potassium oxide.

EXAMPLE X

Preparation of the 2-lithio pyridine N-oxide carbanion salt and the lithium salt of 2-pyridinethiol N-oxide The apparatus of Example I was employed herein. To the reaction flask at approximately 25° C. was added 0.2 grams (0.023 mole) of lithium hydride. After flushing with argon gas, 3.7 grams (0.023 mole) of tetramethylethylenediamine (TMEDA) were added with stirring to form 3.3 grams of a complex of lithium hydride and TMEDA. To the complex formed was added 2.0 grams (0.02 mole) of pyridine N-oxide in 50 ml. of Diglyme and reacted for 2 hours at approximately 25° C. The reaction was completed in 2 hours as evidenced by the cessation of the evolution of hydrogen gas. The reaction with a sulfur transfer agent, 2 grams of 2,3-epithiopropylmethylether (0.02 mole) was at 25° C. for approximately 17-½ hours. The reaction product, the lithium salt of 2-pyridinethiol N-oxide was obtained in approximately a 1.3 gram yield in Diglyme.

Substantially similar results are obtained when complexes of TMEDA and sodium or potassium hydride are employed in lieu of a complex of TMEDA and lithium hydride in that carbanion salts are formed.

EXAMPLE XI

Preparation of 2,2'-dithiopyridine N,N-dioxide

Following the procedure of Example I (A) and (B) above, 2.0 grams (0.02 mole) of pyridine N-oxide were reacted at 60° C. for 12 hours with 0.84 gram of sodium hydride (0.03 mole), the reaction being effected in 100 ml. of Diglyme. The product formed was the 2-sodio pyridine N-oxide carbanion salt in approximately 2.3 gram yield. The reaction product was subsequently reacted at 35° C. for 2 hours with 4.1 grams of sulfur monochloride (0.03 mole), filtered and the filtrate evaporated to dryness to yield approximately 2.1 grams of 2,2'-dithiopyridine-N,N-dioxide.

Substantially similar results are obtained when sulfur monobromide or sulfur monoiodide are employed in lieu of sulfur monochloride.

The corresponding substituted derivatives are obtained when the following substituted pyridine N-oxide compounds are employed in lieu of pyridine N-oxide: 3-methyl pyridine N-oxide; 3-ethyl pyridine N-oxide; 4-n-propyl pyridine N-oxide; 3,4-dimethyl pyridine N-oxide; 4-n-dodecyl pyridine N-oxide; 4 vinyl pyridine N-oxide; 3-allyl pyridine N-oxide; 4-phenyl pyridine N-oxide; 4(2-naphthyl) pyridine N-oxide; 3(2-biphenylyl) pyridine N-oxide; 4-n-hexoxy pyridine N-oxide; 3(2-biphenylyl) pyridine 3,4-diethyl pyridine N-oxide; 3-methyl-4-methoxy pyridine N-oxide; and 2,4-dimethyl pyridine N-oxide.

EXAMPLE XII

Preparation of the 2-lithio-4-n-propyl pyridine N-oxide carbanion salt and the lithium salt of 2-thiol-4-propyl pyridine N-oxide Following the procedure of Example II above, 3.0 grams of 4-n-propyl pyridine N-oxide (0.22 mole) were reacted at 0° C. for 1 hour with (1.5 gram) (0.023 mole) of n-butyl lithium in 30 ml. of tetrahydrofuran. The solution of 2-lithio-4-propylpyridine N-oxide carbanion salt formed thereby was reacted with 2.1 grams (0.02 mole) of 2,3-epithiopropylmethylether at 25° C. for approximately 17-½ hours to yield approximately 1.8 grams of the lithium salt of 4-propyl-2-pyridinethiol N-oxide in tetrahydrofuran.

Substantially equivalent results are obtained when the following strong bases are employed in lieu of n-butyl lithium: methyl lithium; ethyl lithium; n-octyl lithium; n-dodecyl lithium; phenyl lithium; benzyl lithium; lithium metal; 1:1 complex of n-butyl lithium and tetramethylethylenediamine.

EXAMPLE XIII

Preparation of 2-pyridinethiol N-oxide

The dried sodium salt of 2-pyridinethiol N-oxide, obtained from Example I (A) and (B) above, was dissolved in approximately 25 ml. of water and acidified with approximately 10 ml. of 6N hydrochloric acid. Evaporation of the solution resulted in the recovery of 1.4 g. of 2-pyridinethiol N-oxide crystals having a melting point of 70°–72° C.

EXAMPLES XIV – XVII

Preparation of pyridinethiol N-oxides

The salts of pyridinethiol N-oxides prepared in Examples III, V, VII and VIII above were acidified to their corresponding pyridinethiol N-oxide forms employing the procedure described in Example XIII.

EXAMPLE XVIII

Preparation of the zinc salt of 2-pyridine-thiol N-oxide

The sodium salt of 2-pyridinethiol N-oxide prepared in Example VII above was dissolved in approximately 15 ml. of water and was added to a solution of 2.7 grams (0.002 mole) of zinc chloride and allowed to react for approximately 10 minutes at approximately 25° C. The product upon separation by filtration was the zinc salt of N-hydroxy-2-pyridinethione.

The foregoing description of the invention has been presented describing certain operable and preferred embodiments. It is not intended that the invention should be limited since variation and modifications thereof will be obvious to those skilled in the art, all of which are within the spirit and scope of this invention.

What is claimed is:

1. The process of preparing salts of pyridinethiol N-oxides of the formula

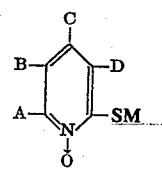

wherein A, B, C and D are each selected from the group consisting of hydrogen; alkyl of from one to about 12 carbon atoms; alkenyl of from two to about 12 carbon atoms; alkoxy of from one to about 12 carbon atoms; aryl of from about six to about 12 carbon atoms; and aryloxy of from six to about 12 carbon atoms; and M is an alkali metal; which comprises (1) reacting at a temperature of about −70° C. to about 150° C. a pyridine N-oxide of the formula

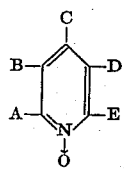

wherein A, B, C, D and E are defined in the same manner as A, B, C and D above and at least one of A and E is hydrogen with a strong alkali metal-containing base selected from the group consisting of alkali metals; alkali metal oxides; alkali metal hydrides; alkali metal alkyls of from one to about 12 carbon atoms; alkali metal alkoxides of from one to about 4 carbon atoms; alkali metal aryls of from six to about 14 carbon atoms; alkali metal aralkyls of from seven to about 15 carbon atoms; alkali metal amides of the formula

wherein each R is hydrogen or alkyl of one to about four carbon atoms and M is an alkali metal; alkali metal sulfinyl carbanion salts of the formula

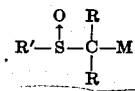

wherein R' is an alkyl of from one to about four carbon atoms and each R is as defined above; complexes of alkali metal hydrides and amines of the formula $R_2N—R'—NR_2$ wherein each R is an alkyl of from one to about 20 carbon atoms and R' is an alkylene group containing from one to about five carbon atoms and wherein the total number of carbon atoms in said amine is from five to about 28 carbon atoms; and complexes of alkali metal alkyls having from one to about 12 carbon atoms and amines of the formula $R_2N—R'—N—R_2$ wherein each R is an alkyl of from one to about 20 carbon atoms and R' is an alkylene group containing from one to about five carbon atoms and wherein the total number of carbon atoms in said amine is from five to about 28 carbon atoms; and (2) reacting at a temperature of from about −70° C. to about 150° C. the product formed thereby with a neutral or electrophilic sulfur-containing transfer agent selected from the group consisting of 1. elemental sulfur;
2. alkali metal sulfides of the formula $M_2S_x$ where M is an alkali metal and $x$ is an integer from 2 to 20;
3. ammonium sulfides of the formula $(NH_4)_2S_x$ where $x$ is an integer from 2 to 20;
4. sulfurammonium, $S_4N_4$;
5. thiophosphoryl trihalides of the formula $P(S)X_3$ where X is halogen;
6. alkyl- or aryldihalophosphine sulfides of the formula $R-P(S)X_2$; where R is alkyl of from one to about 12 carbon atoms or aryl of from six to about 14 carbon atoms; and X is halogen;
7. dialkylhalophosphine sulfides of the formula $R_2P(S)X$ where each R is alkyl of from one to about 12 carbon atoms and X is halogen;
8. phosphinyl sulfenyl halides of the formula $R(RO)P(O)SX$ where each R is alkyl of one to about 12 carbon atoms and X is halogen;
9. tetraalkylphosphonate disulfides of the formula $[(RO)_2 P(S)]_2$ where each R is alkyl of one to about 12 carbon atoms;
10. ethylene diphosphine disulfides of the formula $[R_2P(S)CH_2—]_2$ where each R is alkyl of one to about 12 carbon atoms;
11. isothiocyanates of the formula $RNC=S$ where R is an alkyl of from one to about 12 carbon atoms; aryl of six to about 14 carbon atoms and alkenyl of from two to about 12 carbon atoms;
12. diisothiocyanates of the formula $SCN—R—NCS$ where R is an alkylene radical of from one to about 12 carbon atoms
13. thioepoxides of the formula

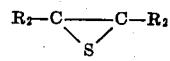

where each R is hydrogen or an alkyl or alkoxy of from one to about 12 carbon atoms; or aryl of from six to about 14 carbon atoms;
14. ethylenethiocarbonates of the formula

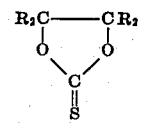

where each R is hydrogen; alkyl of from one to about 12 carbon atoms; or aryl of six to about 14 carbon atoms;
15. thioketones of the formula $R_2C=S$ where each R is a tertiary alkyl of from four to about 12 carbon atoms or aryl of from six to about 12 carbon atoms; and
16. organopolysulfides of the formula $R—(S)_x—R$ where each R is alkyl of from one to about 12 carbon atoms; or alkenyl of from two to about 12 carbon atoms; and $x$ is an integer from 2 to 4.

2. The process of claim 1 wherein the pyridine N-oxide is reacted with an alkali metal-containing base at from about 0° to about 80° C. and the reaction product is reacted with a sulfur-containing transfer agent at from about 25° to 80° C.

3. The process of claim 1 wherein the amount of strong base employed in step (1) is from about 0.5 to about 10 moles per mole of pyridine N-oxide and the amount of sulfur-containing transfer agent employed in step (2) is from about 0.5 to about 10 moles per mole of product formed in step (1).

4. The process of preparing 2,2'-dithiopyridine N,N-dioxides of the formula

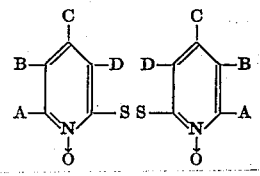

wherein A, B, C and D are each selected from the group consisting of hydrogen; alkyl of from one to about 12 carbon atoms; alkenyl of from two to about 12 carbon atoms; alkoxy of from one to about 12 carbon atoms; aryl of from about six to about 12 carbon atoms; and aryloxy of from six to about 12 carbon atoms which comprises 1. reacting at a temperature of about −70° C. to about 150° C. a pyridine N-oxide of the formula

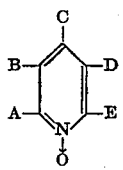

wherein A, B, C, D and E are defined in the same manner as A, B, C and D above and at least one of A and E is hydrogen with a strong alkali metal-containing base selected from the group consisting of alkali metals; alkali metal oxides; alkali metal hydrides; alkali metal alkyls of from one to about 12 carbon atoms; alkali metal alkoxides of from one to about 4 carbon atoms; alkali metal aryls of from six to about 14 carbon atoms; alkali metal aralkyls of from seven to about 15 carbon atoms; alkali metal amides of the formula

wherein each R is hydrogen or alkyl of one to about four carbon atoms and M is an alkali metal; alkali metal sulfinyl carbanion salts of the formula

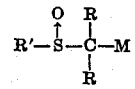

wherein R' is an alkyl of from one to about four carbon atoms and each R is as defined above; complexes of alkali metal hydrides and amines of the formula $R_2N—R'—NR_2$ wherein each R is an alkyl of from one to about 20 carbon atoms and R' is an alkylene group containing from one to about five carbon atoms and wherein the total number of carbon atoms in said amine is from five to about 28 carbon atoms; and complexes of alkali metal alkyls having from one to about 12 carbon atoms and amines of the formula $R_2N—R'—N—R_2$ wherein each R is an alkyl of from one to about 20 carbon atoms and R' is an alkylene group containing from one to about five carbon atoms and wherein the total number of carbon atoms in said amine is from five to about 28 carbon atoms; and (2) reacting at a temperature of from about −70° C. to about 150° C. the product formed thereby with a sulfur monohalide.

5. The process of claim 4 wherein the reaction of step (1) is conducted by reacting from about 0.5 to about 10 moles of strong base per mole of pyridine N-oxide at a temperature of from about 0° C. to about 80° C. and the reaction of step (2) is conducted by reacting from about 0.25 to 5 moles of sulfur monohalide per mole of product formed in step (1) at a temperature of from about 25° C. to about 80° C.

* * * * *

UNITED STATES PATENT OFFICE
CERTIFICATE OF CORRECTION

PO-1050
(5/69)

Patent No. 3,700,676        Dated October 24, 1972

Inventor(s) Ralph A. Damico

It is certified that error appears in the above-identified patent and that said Letters Patent are hereby corrected as shown below:

Column 11, line 2, "$[R_2P(S)CH2-]_2$" should be -- $[R_2P(S)CH_2-]_2$ --

Column 11, line 4, "RNC-S" should be -- RNC=S --

Column 11, line 62, "chloride" should be deleted.

Column 11, line 63, "$[(C_2H_5O)_2P(S)]bz2$" should be -- $[(C_2H_5O)_2P(S)]_2-$ Column 11, line 64, "$[(CH_3)_2P(S)CH_2]_2$" should be -- $[(CH_3)_2P(S)CH_2-]_2$ Column 12, line 32, "N-" should be inserted before "oxide"

Column 12, line 47, 2 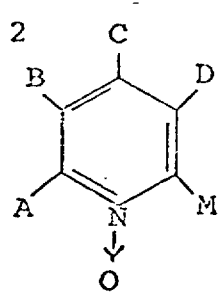 should be -- 2 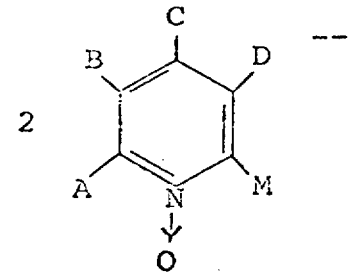 --

Signed and sealed this 3rd day of July 1973.

(SEAL)
Attest:

EDWARD M. FLETCHER, JR.
Attesting Officer

Rene Tegtmeyer
Acting Commissioner of Patents